US007320823B2

(12) United States Patent
Kitahara et al.

(10) Patent No.: US 7,320,823 B2
(45) Date of Patent: Jan. 22, 2008

(54) LIGHT DIFFUSING BODY AND A TRANSMISSION TYPE SCREEN

(75) Inventors: Keiichi Kitahara, Kounosu (JP); Hideki Etori, Saitama (JP); Yoshihisa Kimura, Tokyo (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 11/704,998

(22) Filed: Feb. 12, 2007

(65) Prior Publication Data
US 2007/0190291 A1 Aug. 16, 2007

(30) Foreign Application Priority Data
Feb. 14, 2006 (JP) .............................. 2006-036262

(51) Int. Cl.
*B32B 7/02* (2006.01)
*B32B 5/14* (2006.01)
*G02B 5/02* (2006.01)
*G02B 13/20* (2006.01)

(52) U.S. Cl. ...................... 428/212; 428/323; 359/599; 359/615; 349/64; 349/112; 349/122

(58) Field of Classification Search ...................... None
See application file for complete search history.

(56) References Cited
U.S. PATENT DOCUMENTS

| | | | |
|---|---|---|---|
| 6,177,153 B1 * | 1/2001 | Uchiyama et al. ............ 428/1.1 |
| 6,348,960 B1 * | 2/2002 | Etori et al. ................... 349/112 |
| 6,654,085 B1 * | 11/2003 | Koike et al. ................. 349/112 |
| 6,771,335 B2 * | 8/2004 | Kimura et al. ............... 349/112 |
| 6,804,053 B2 * | 10/2004 | Etori et al. ................... 359/453 |
| 6,846,098 B2 * | 1/2005 | Bourdelais et al. .......... 362/330 |
| 6,848,795 B2 * | 2/2005 | Kaminsky et al. ........... 353/120 |
| 6,900,941 B2 * | 5/2005 | Kaminsky et al. ........... 359/599 |
| 6,963,447 B2 * | 11/2005 | Honda .......................... 359/452 |
| 6,963,451 B2 * | 11/2005 | Se et al. ....................... 359/599 |
| 7,045,169 B2 * | 5/2006 | Freeman et al. ............. 427/180 |
| 7,187,441 B1 * | 3/2007 | Sevick-Muraca et al. ... 356/336 |
| 7,187,834 B2 * | 3/2007 | Iwasaki ........................ 385/129 |
| 7,224,874 B2 * | 5/2007 | Iwasaki et al. .............. 385/129 |
| 2001/0005282 A1 * | 6/2001 | Etori et al. ................... 359/453 |
| 2002/0001055 A1 * | 1/2002 | Kimura et al. ............... 349/112 |

(Continued)

FOREIGN PATENT DOCUMENTS
JP          01-269901         10/1989

(Continued)

*Primary Examiner*—Vivian Chen
(74) *Attorney, Agent, or Firm*—Bacon & Thomas, PLLC

(57) ABSTRACT

A light diffusing body and transmission type screen, which can reduce the shift of the color tone of the light source light seen through the light diffusing body and prevent the phenomenon that the white light source seen through the light diffusing body looks colored, is provide.

The light diffusing body 1 of the present invention comprises a transparent resin and spherical micro-particles having a different refractive index from that of the said transparent resin, wherein the relation between the maximum value ($E_{max}$) and the minimum value ($E_{max}$) of the effective scattering efficiency values (E) obtained for each center wavelength in the wavelength ranges of blue, green and red by dividing the sum of scattering cross-sections of all spherical micro-particles contained in the unit area of the aforementioned light diffusing body 1 by the sum of geometrical cross-sections of all these spherical micro-particles satisfies $E_{min}/E_{max} \geq 0.90$.

18 Claims, 3 Drawing Sheets

U.S. PATENT DOCUMENTS

| | | | |
|---|---|---|---|
| 2002/0005924 A1* | 1/2002 | Kimura | 349/112 |
| 2004/0160673 A1* | 8/2004 | Se et al. | 359/599 |
| 2004/0203312 A1* | 10/2004 | Bortscheller et al. | 445/24 |
| 2005/0243561 A1* | 11/2005 | Etori | 362/331 |
| 2007/0171654 A1* | 7/2007 | Etori | 362/351 |
| 2007/0182882 A1* | 8/2007 | Etori | 349/64 |
| 2007/0183050 A1* | 8/2007 | Etori | 359/582 |

FOREIGN PATENT DOCUMENTS

| | | | |
|---|---|---|---|
| JP | 06-155674 | * | 6/1994 |
| JP | 11-111464 | * | 4/1999 |
| JP | 2002-258011 | * | 9/2002 |
| JP | 2004-341446 | * | 2/2004 |
| JP | 2005-024942 | * | 1/2005 |

* cited by examiner

LIGHT DIFFUSING BODY AND A TRANSMISSION TYPE SCREEN

TECHNICAL FIELD

The present invention relates to a light diffusing body and a transmission type screen, which can reduce the shift of color tone of the light from a light source seen through the light diffusing body, and in particular a light diffusing body and a transmission type screen, which can prevent the phenomenon that a white light source looks colored when seen through the light diffusing body.

BACKGROUND ART

Light diffusing bodies have been conventionally used in various optical applications, including transmission type screens.

A light diffusing body to be used in the transmission type screens requires the properties that the light source of a projector behind the screen is not directly seen through and that the brightness of the whole screen is not reduced. There have been proposed a light diffusing plate (refer to Patent document 1) and a transmission type screen (refer to Patent document 2), in which an optimal balance between the transmission and diffusion of light was taken into account.

In the transmission type screen, in which the projector side is seen through (transmissible), the projector is installed not at a front position but at an oblique position to prevent that the light source is seen directly.

However, even the projector is installed at an oblique position, the light source may be seen when coming closer to the screen. Even for the see-through transmission type screens, if they have a high haze, a project may be installed at a front position. In this case, the light source may be visible.

These cases cause the phenomenon that the light source seen through the light diffusing body looks red, yellow, blue etc. It then caused the problem that the colored light source overlaps the images displayed on the screen, and that the images look as colored.

[Patent document 1] Japanese Patent Unexamined Publication (KOHO) No. 1989-269901 (Prior art)

[Patent document 2] Japanese Patent Unexamined Publication 2005-024942 (KOHO) (Object to be achieved by the invention)

DISCLOSURE OF THE INVENTION

Therefore, an object of the present invention is to provide a light diffusing body and a transmission type screen, which can reduce the shift of color tone of the light from the light source seen through the light diffusing body, and prevent the phenomenon that the white light source looks colored when seen through the light diffusing body.

In order to achieve the foregoing object, the inventors of the present invention conducted a diligent study of the light scattering and its dependency on wavelength, with respect to the internal scattering system, to which the Mie scattering theory is applied, namely, the scattering system, in which micro-particles having a diameter of 50 µm or less are dispersed in a transparent medium having a refractive index different from the micro-particles.

As a result of the study, they found that the phenomenon, in which the color of the light source seen through the light diffusing body shifts to the tones, such as red, yellow and blue, is attributable to the wavelength-dependency of the scattering cross-section, which determines light scattering property, that the wavelength-dependency of the scattering cross-section depends on the distribution of particle diameters, and that by rendering an appropriate scattering cross-section distribution characteristics by taking the particle diameter distribution into consideration, the foregoing phenomenon can be prevented, and as a result, they achieved the object of the present invention.

That is, the light diffusing body of the present invention comprises transparent resin and a light diffusing body made of micro-particles having a different refractive index from that of the said transparent resin, wherein when the value obtained by dividing the sum of scattering cross-sections of all spherical micro-particles contained in the unit area of the light diffusing body by the sum of geometrical cross-sections of all these spherical micro-particles for each of multiple wavelengths (hereinafter the value is referred to as "effective scattering efficiency"), the minimum value ($E_{min}$) of all of the effective scattering efficiency obtained for each wavelength is 90% or more of the maximum value ($E_{max}$).

In particular, the light diffusing body of the present invention is a light diffusing body, wherein the maximum value ($E_{max}$) and the minimum value ($E_{min}$) of the effective scattering efficiency values (E) obtained for each center wavelength in the ranges of wavelengths for blue, green and red satisfy the equation, $E_{min}/E_{max} \geq 0.90$.

The effective scattering efficiency (E) of the light diffusing body is expressed with the particle distribution function f(r) by the equation (1) below.

$$E = \int_0^{r_{max}} Q(\lambda, r) f(r) dr / \int_0^{r_{max}} \pi r^2 f(r) dr \qquad (1)$$

where, Q is a scattering cross section of one spherical micro-particle and a function of wavelength ($\lambda$) and particle diameter (r), f(r) is a function of particle diameter distribution and $r_{max}$ is a maxim radius of the particle.

The scattering cross section (Q) of one spherical micro-particle can be obtained according to the Mie scattering theory from Equation (2), in which the refractive index of the micro-particle is $n_s$, the refractive index of transparent resin is nm, and the wavelength of incident light is $\lambda$.

$$Q(\lambda, r) = \frac{\lambda^2}{2\pi n_m^2} R\left\{\sum_{k=1}^{\infty} (-i)^{k+1} k(k+1)(A_k + B_k)\right\} \qquad (2)$$

[where R shows the real part in { }]

$$A_k = i^{k+1} \frac{2k+1}{k(k+1)} \frac{n_{sm}\psi_k'(q)\psi_k(n_{sm}q) - \psi_k(q)\psi_k'(n_{sm}q)}{n_{sm}\zeta_k'(q)\psi_k(n_{sm}q) - \zeta_k(q)\psi_k'(n_{sm}q)} \qquad (3)$$

$$B_k = i^{k+1} \frac{2k+1}{k(k+1)} \frac{n_{sm}\psi_k(q)\psi_k'(n_{sm}q) - \psi_k'(q)\psi_k(n_{sm}q)}{n_{sm}\zeta_k(q)\psi_k'(n_{sm}q) - \zeta_k'(q)\psi_k(n_{sm}q)} \qquad (4)$$

$$q = \frac{2n_m \pi r}{\lambda} \qquad (5)$$

$$n_{sm} = \frac{n_s}{n_m} \qquad (6)$$

$$\psi_k(z) = \sqrt{\frac{\pi z}{2}} J_{k+1/2}(z) \qquad (7)$$

-continued $$\zeta_k(z) = \psi_k(z) + i\sqrt{\frac{\pi z}{2}} Y_{k+1/2}(z) \quad (8)$$

$\psi'_k(z)$ and $\zeta'_k(z)$ in Equation (3) and Equation (4) represent differentiation of $\psi_k(z)$ and $\zeta_k(Z)$ by z, respectively, and $J_{k+1/2}(z)$ in Equation (7) and $Y_{k+1/2}(z)$ in Equation (8) are the Bessel functions of the first kind and the second kind, respectively, where i is an imaginary unit.

The transmission type screen of the present invention is a transmission type screen, wherein the aforementioned light diffusing body is provided.

EFFECT OF THE INVENTION

The principle with which the light diffusing body of the present invention can reduce the shift of the wavelength of a scattering light will be explained below.

The methods used for scattering light include the external scattering, in which light is scattered by fine convexoconcaves on the surface, and the internal scattering, in which a light is scattered by fine distribution of refractive indices inside the light diffusing body. The light diffusing body of the present invention scatters light by the method of internal scattering. In the case in which the external scattering is used, in general, because the light can no longer be scattered when the convexoconvaces on the surface are filled up, the light diffusing body cannot be bonded with other material by using adhesive etc. By contrast, the internal scattering can be used for the light diffusing body which is adhesively bonded with other material because the internal scattering has nothing to do with the conditions of the surface.

In making a fine refractive index distribution to make the internal scattering arise, the method for dispersing spherical micro-particles having a refractive index different from that of a transparent resin in which the micro-particles are dispersed is used in general, and the light diffusing body of the present invention applies this method.

In this type of light diffusing body, the light scattering property differs depending on the wavelength of incident light even if the same light diffusing body is used. This is explained by the reason that even if the combination of the same transparent resin and spherical micro-particles is used, the scattering cross section area, which determines the light scattering property, differs depending on the wavelength of incident light. That is, the light scattering property (or scattering cross-section) differs depending on the wavelength of blue, green and red, which constitute a white light of the projector. Because the light having a wavelength with a large scattering cross-section is likely to scatter more when incident light passes through a light diffusing body, the amount of parallel rays in the said range of wavelength which passes through the diffusing body without being scattered becomes relatively low. On the other hand, since the light having a wavelength with a small scattering cross-section is unlikely to be scattered, the amount of the parallel rays (light) of the said range of wavelength becomes relatively high. As a result, there occurs the phenomenon that the light from the light source, originally white in color, looks as shifted to the color tone such as red, yellow or blue.

Further, the diameter of spherical micro-particles used for this application is generally 50 μm or smaller, and the scattering cross-section of the spherical micro-particles having a diameter in the abovementioned range of particle diameter greatly varies according to the particle diameter. FIG. 6 shows an example of plot graphs, in which the scattering cross-section per geometrical cross-section of the spherical micro-particle (it may be referred to as "scattering efficiency" of particle) is plotted against the particle diameter. From this graph it is apparent that the diameter of the particle, which shows almost the same scattering efficiency for the light having any wavelength of blue, green and red, is limited to a very narrow range (In case of FIG. 6, the wavelength at around 4.6 μm). If the spherical micro-particles of mono dispersion having a diameter in this range, there hardly occurs the shift of the color in the light from the light source. However, the use of spherical particles of mono dispersion requires a high cost, and because the range of the allowable particle diameter is extremely narrow, the cost may become even higher if the differences in particle diameters are taken into consideration, and the maintenance of stable light scattering characteristics is difficult.

On the other hand, it is possible to use spherical micro-particles of multiple-dispersion having a distributed particle diameters. However, since the scattering efficiency of the particles, which are contained there and have different diameters, greatly varies even within the range of the diameters of contained particles, it is apparent that the comparison of scattering efficiency with that average particle diameter is meaningless.

In contrast, in the present invention, by reducing difference in scattering at each wavelength of blue, green and red light in view of the distribution of diameters of the spherical micro-particles composing the light diffusing body, the phenomenon that the color tone of the light from the light source is shifted when seen through the light diffusing body and in particular the white light source looks colored can be prevented.

BEST MODE FOR CARRYING OUT THE INVENTION

Figure 1:
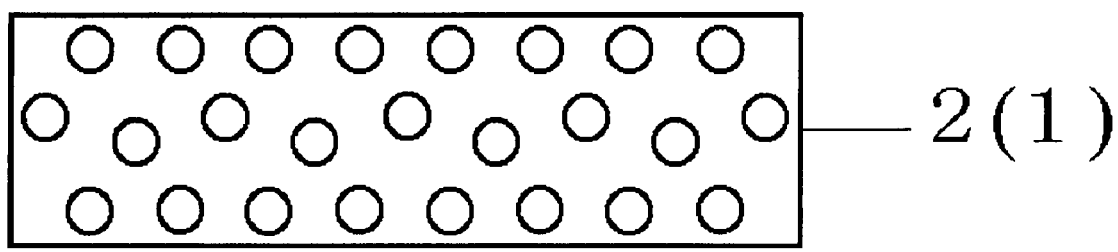
FIG. 1 A sectional view showing an example of the light diffusion body of the present invention FIG. 2 A sectional view showing another example of the light diffusion body of the present invention FIG. 3 A sectional view showing another example of the light diffusion body of the present invention FIG. 4 A sectional view showing another example of the light diffusion body of the present invention FIG. 5 A sectional view showing an example of the transmission type screen of the present invention FIG. 6 A graph showing a relationship between particle diameter and scattering efficiency in each range of wavelength.

Hereafter, the embodiment of the light diffusing body of the present invention will be explained.

The light diffusing body of the present invention has a light diffusing layer comprises a transparent resin and spherical micro-particles having a different refractive index from that of the said transparent resin. In the light diffusing layer, the minimum value ($E_{min}$) of the effective scattering efficiency values(E) obtained for each of the multiple wavelengths is 90% or more of the maximum value ($E_{max}$), or the ratio of $E_{min}$ to $E_{max}$, namely, $E_{min}/E_{max}$ is 0.9 or more.

The lights of multiple wavelengths are, for example, three primary colors of light which constitute an image of the projector, i.e., blue, green and red. The ranges of the wavelengths are, specifically, 420 nm-480 nm (center wavelength of 450 nm) for blue, 520 nm-580 nm (center wavelength of 550 nm) for green and 590 nm-650 nm (center wavelength of 620 nm) for red. In this embodiment, these three primary colors are explained, but the combination, the number and the wavelength ranges of multiple lights may be different depending on the projector to be used.

The effective scattering efficiency E is obtained by dividing the sum of scattering cross-sections of all spherical micro-particles contained in the unit area of the light diffusing body by the sum of geometrical cross-sections of all these spherical micro-particles, and can be calculated if the resin (a refractive index) and particles (a refractive index and a particle distribution) which compose the light diffusing body are determined. The values of effective scattering efficiency are obtained for each center wavelength in the wavelength range of blue, green and red lights. If the values of effective scattering efficiency obtained for each wavelength are $E_B$, $E_G$ and $E_R$, the light diffusing body of the present invention comprises the resin and particles, wherein the ratio of the minimum value ($E_{min}$) to the maximum value ($E_{max}$) of the effective light scattering efficiency, or $E_{min}/E_{max}$ is 0.9 or more and 1 or less. By making the ratio $E_{min}/E_{max}$ as 0.9 or more, the shift of the tone of the light from the light source seen through the light diffusing body can be reduced, and the phenomenon that the white color source seen through the light diffusing body looks colored can be prevented. As the ratio of $E_{min}/E_{max}$ becomes closer to 1, the coloration of the light is more reduced. Therefore, the ratio is preferably 0.95 or higher, and more preferably 0.99 or higher.

In order to make the ratio of the minimum value to the maximum value of effective scattering efficiency E fall in the aforementioned range, for example, the following measures can be taken. Firstly, the combination of the resin and the particles composed of certain components are determined. In this procedure, the refractive indices of the resin and the particles are determined. Then, from the refractive indices and the particle distribution, the effective scattering efficiency E for each center wavelength in the wavelength ranges of blue, green and red lights are obtained for the particle samples having various particle diameter distributions and average particle diameters. Based on these results, $E_{min}$ and $E_{max}$ and the ratio, $E_{min}/E_{max}$, for each sample are determined. Then the combinations of resin and particles, the $E_{min}/E_{max}$ of which falls in the aforementioned range are selected. The particle diameter distribution and the average particle diameter can be known by measuring the particle diameter distribution of each sample with the Coulter Counter method etc.

Hereafter, the structure of the light diffusing body of the present invention will be explained by referring to drawings.

Figure 2:
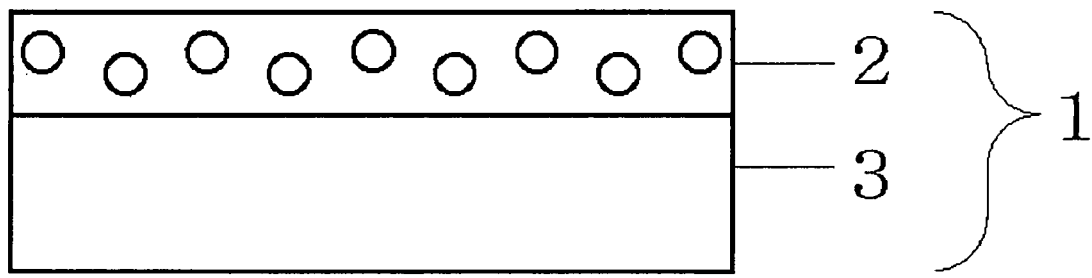
Figure 3:
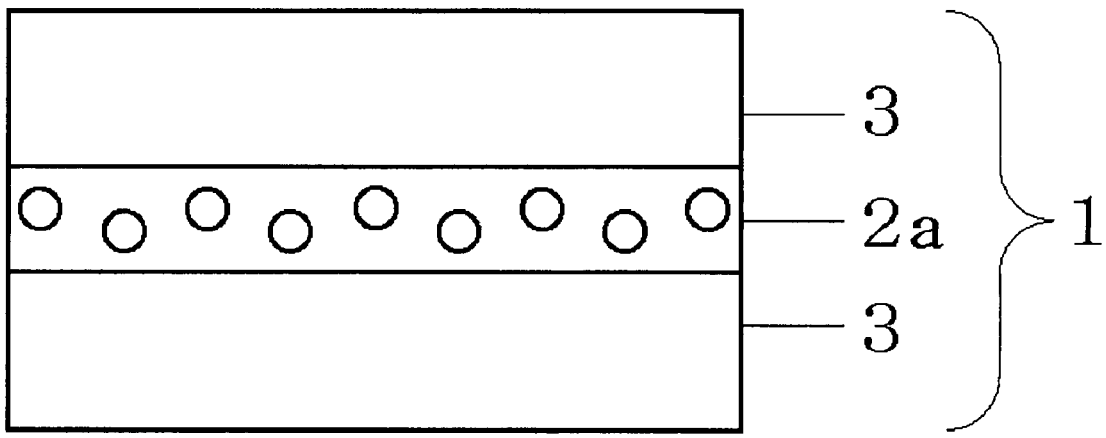
Figure 4:
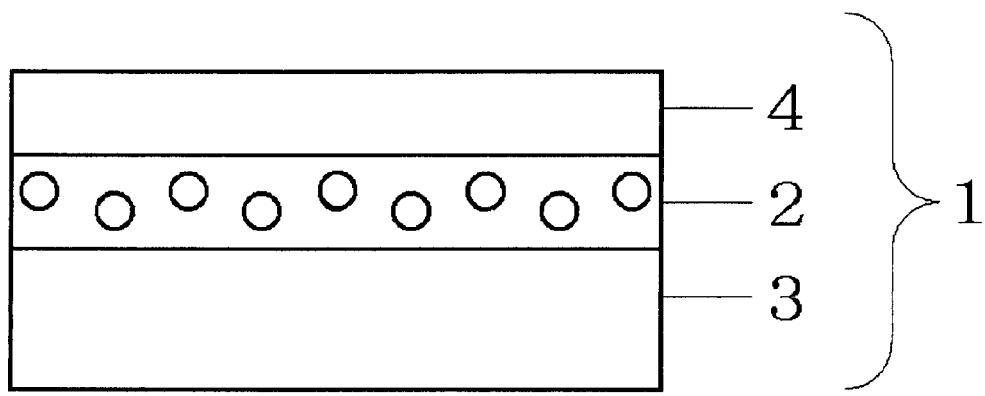

The light diffusing body of the present invention 1 may be a single layer consisting of the light diffusing layer 2 comprising a transparent resin and spherical micro-particles having a different refractive index from that of the said transparent resin, as shown in FIG. 1 or a transparent polymer film 3 is laminated at least on one surface of the light diffusing layer 2, as shown in FIG. 2. Alternately, the transparent polymer film 3 may be laminated on both surfaces of the adhesive light diffusing layer 2, as shown in FIG. 3, or one surface of the light diffusing layer 2 is laminated by the transparent polymer film 3 and the other surface is laminated by an antireflection layer 4, as shown in FIG. 4.

Since the light diffusing body of the present invention utilizes internal scattering, when the light diffusing layer is provided on the surface, it is preferable that the surface of the light diffusing body is practically smooth. Specifically, the arithmetical mean roughness (Ra) according to JIS B0601:2001 is 0.30 μm or less, preferably 0.15 μm or less.

As the transparent resin composing a light diffusing body, the resins such as thermoplastic resins, thermosetting resins, ionizing radiation curable resins and so forth can be used. Specifically, polyester type resins, acrylic type resins, acrylic urethane type resins, polyester acrylate type resins, polyurethane acrylate type resins, epoxy acrylate type resins, urethane type resins, epoxy type resins, polycarbonate type resins, cellulose type resins, acetal type resins, vinyl type resins, polyethylene type resins, polystyrene type resins, polypropylene type resins, polyamide type resins, melamine type resins, phenol type resins, silicone type resins and fluorocarbon type resins can be used. The mixture of one or more of such resins can be used, and such combination may adjust the refractive index as required.

Further, by using a resin having adhesiveness, the light diffusing body can be made into an adhesive light diffusing body. Specifically, the resins having adhesiveness include the resins used as known transparent adhesive, such acrylic type adhesive, rubber type adhesive, urethane type adhesive and silicone type adhesive.

Spherical micro-particles need to have a different refractive index from that of the transparent resin chosen. Specifically, a relative refractive index ($n_{sm}$) obtained in accordance with the aforementioned Equation (6) is preferably $0.91 < n_{sm} < 1.09$ (however, $n_{sm} \neq 1.00$).

The spherical micro-particles which can be used include inorganic type micro-particles, such as silica, alumina, talc, zirconia, zinc oxide and titanium dioxide, and because of their relative easiness in producing spherical form, organic type micro-particles such as those made of polymethyl methacrylate resin, polystyrene resins, polyurethane resins, benzoguanamine resin and silicone resins particles are preferable.

Figure 6:
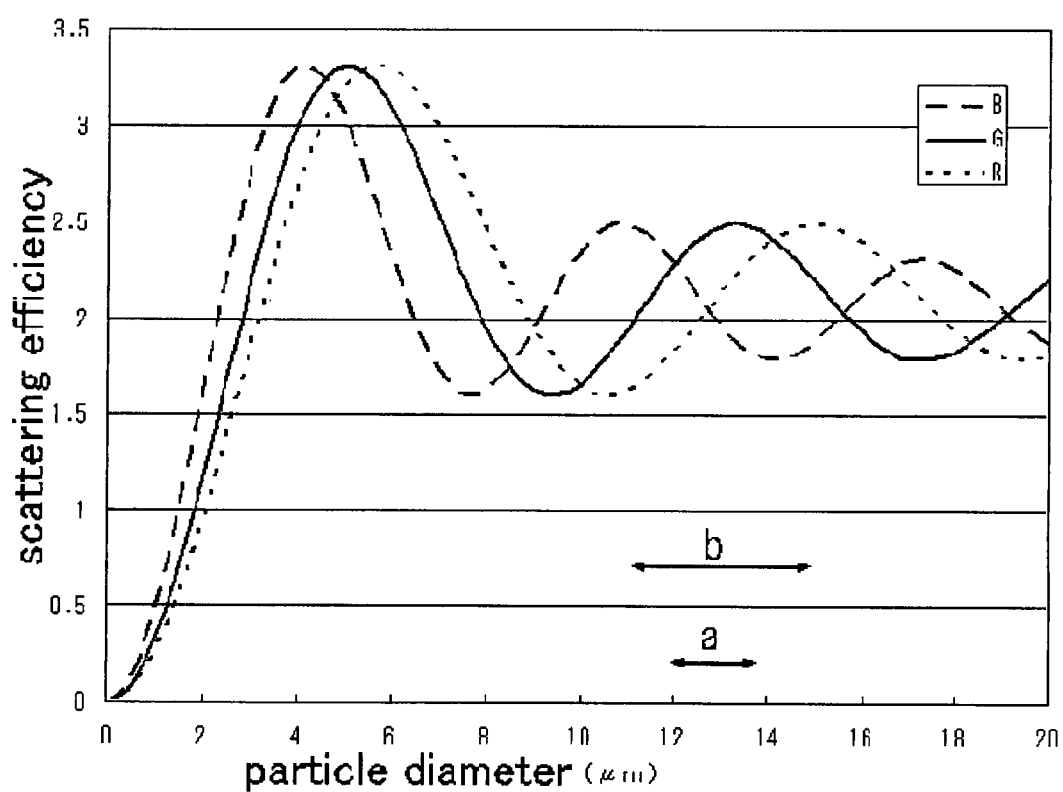

In the present invention, because the combination of resin and particles will be determined based on the effective scattering efficiency E (its ratio), as aforementioned, the particle diameter and the particle diameter distribution of spherical micro-particles are not particularly limited as far as the equation $E_{min}/E_{max} \geq 0.90$ is satisfied. However, the particle diameter is preferably 50 μm or less, which is a common particle diameter for the light diffusing body using internal scattering. Further, wider particle diameter distribution is more preferable because it can average the fluctuations of the scattering efficiency depending on the particle diameter. As shown in FIG. 6 illustrating the scattering efficiency depending on the particle diameter, the particles having the width of the particle diameter distribution [b] can average the fluctuation of the scattering efficiency depending on the particle diameter more than the particles having the width [a]. The coefficient of variation of the particle diameter distribution is in the range between 10% and 50%, preferably 20% or higher, and more preferably 30% or higher. The upper limit of the coefficient is preferably 40% or lower.

The content of particles is not particularly limited as far as the combination of resin and particles satisfies $E_{min}/E_{max} \geq 0.90$, but influences the haze and transmissibility of a light diffusing body. Accordingly, even the light diffusing bodies satisfy the aforementioned requirement, the one with a higher content of particles is chosen from them for the applications of the light diffusing body, in which a higher haze is required, whereas the light diffusing body with a lower content of particles is chosen for the applications requiring a lower haze.

The light diffusing body as above explained can be formed by melting transparent resin, into which spherical particles are then added, and making it into a sheet, or by coating a paint produced from spherical micro-particles and transparent resin on a transparent polymer film and so forth.

As such transparent polymer film, any highly transmissible film can be used, including highly transparent polymer films such as polyethylene terephthalate, polybutylene terephthalate, polyethylene naphtahalate, polycarbonate, polyethylene, polypropylene, polystyrene, triacetylcellulose, acrylic, polyvinyl chloride, cyclic olefin and other films The thickness of the transparent polymer film is not particularly limited as far as it does not disturb the light scattering property of the light diffusing layer.

In the case that the anti-reflection layer 4 is provided on the light diffusing layer 2, as shown in FIG. 4, paint produced from spherical micro-particles and transparent resin can be coated on the anti-reflection film. Alternately, the anti-reflection layer 4 can be provided by laminating an anti-reflection film on the light diffusing layer 2. As such anti-reflection film, the known materials such as anti-reflection film in which layers having different refractive indices are laminated can be used. Provision of the anti-reflection layer can prevent the reflection of lights.

Hereafter, the transmission type screen of the present invention will be explained. The transmission type screen of the present invention is equipped with the aforementioned light diffusing body. The embodiment of the transmission type screen of the present invention will be explained below with reference to FIG. 5.

Figure 5:
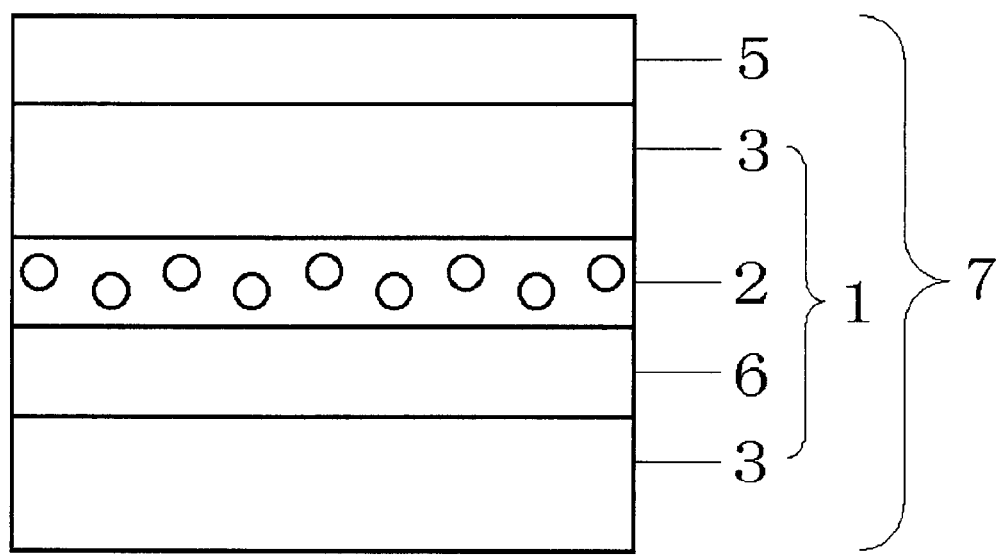

The transmission type screen 7 shown in FIG. 5 is of a structure, wherein on one surface of the transparent polymer film 3 a light diffusing layer 2 is provided and on the other surface a hard coat layer 5, and further on the light diffusing layer 2 other transparent polymer film 3 is provided via an adhesive layer 6. The light diffusing layer 2 comprises a transparent resin and spherical micro-particles having a different refractive index from that of the said transparent resin, wherein the ratio of the maximum value to the minimum value of the effective scattering efficiency E obtained for each of the multiple wavelengths satisfies the aforementioned requirement for the light scattering body.

As the transparent polymer film, any film having a high transmissibility can be used, including those used for the light diffusing body of the present invention. As a transmission type screen, in particular, a biaxial stretched polyethylene terephthalate film having good mechanical strength and dimensional stability can be used preferably. Further, in some applications, the films produced by providing an easy-to-adhere layer on such transparent film can be preferably used.

The thickness of the transparent polymer film is not particularly limited, but can be chosen, as appropriate, by taking its handleability.

Further, the transmission type screen of the present invention is not limited to transparent polymer film, and transparent material such as plastic plate and glass can be used.

The light diffusing layer provided on one surface of the transparent polymer film is the light diffusing layer used in the aforementioned light diffusing body, and comprises a transparent resin and spherical micro-particles having a different refractive index from that of the said transparent resin. By increasing or decreasing the amount per unit area of spherical micro-particles to be used in the light diffusing layer, the values such as screen gain, haze, and transmissibility can be adjusted.

The hard coat layer to be provided on other surface is to protect the surface of the transparent polymer film and has an ability to prevent scratches and the reflection of lights on the surface. As the resins to be used for such hard coat layer, thermoplastic resins, thermosetting resins, ionizing radiation curable resins and so forth can be used as appropriate. However, because of its good anti-scratch property, it is preferable to use the ionizing radiation curable resins and add pigments into such resin to prevent the reflection of light on the surface.

As the adhesive for bonding the light diffusing layer and other transparent polymer film, known and commonly used transparent adhesives such as acrylic type adhesives, rubber type adhesives, urethane type adhesives and silicone type adhesive can be used. It is preferable to use the adhesives, the refractive index of which is same as that of the binder resin composing the light diffusing body. For example, in case acrylic resin is used for the light diffusing layer the use of acrylic type adhesive is preferable.

This adhesive layer has a thickness which should not disturb transmissibility and renders appropriate adhesiveness. Specifically, the thickness is preferably in the range between the lower limit of 0.5 μm or more, preferably 1 μm or more, more preferably 2 μm or more and the upper limit of 30 μm or less, preferably 15 μm or less, and more preferably 10 μm or less.

The hard coat layer, adhesive layer and so forth can be provided by preparing a coating solution by adding other components in accordance with the individual constituents and requirements, melting or dispersing it in an appropriate solvent, coating the solution by the known methods such as roll coating method, bar coating method, spray coating method and air-knife coating method and curing with an appropriate curing method, as required, after drying.

According to the transmission type screen of the present embodiment, the shift of the color tone of the light from the light source seen through the screen can be reduced, and the phenomenon that the white light source looks colored when seen through the screen is prevented.

The light diffusing body 1 according to this embodiment is explained as consisting of a transparent polymer film on one surface of the light diffusing layer 2 and a transparent polymer film via adhesive layer on other surface. The light diffusing body as shown in FIGS. 1 to 4 or the one having a hard coat layer on its uppermost surface can also be used alone as a transmission type screen of the present invention.

EXAMPLES

Hereafter, the present invention will be further explained with reference to examples. The term and symbol "part" and "%" are used on weight basis, unless otherwise indicated.

Example 1

On one surface of a transparent polymer film having a thickness of 188 μm (Lumirror T60: Toray Industries, Inc.), a coating solution for light diffusing layer having the following composition was applied by the bar coating method and curing at 120° C. for 5 minutes to form a light diffusing layer having a thickness about 15 μm. Then, on the light diffusing layer an ultraviolet light curable acrylic type adhesive (refractive index of 1.50) was further applied and dried, and a transparent polymer film was adhered to obtain a light diffusing body. The refractive index of the cured resin excluding particles in the following formulation was 1.519. Further, a particle diameter distribution of styrene micro-particles was measured and, according to Equation 1, the value (effective scattering efficiency E) was obtained for each center wavelength in the wavelength ranges of blue, green and red lights, by dividing the sum of scattering cross-sections of all spherical micro-particles contained in the unit area of the aforementioned light diffusing body by the sum of geometrical cross-sections of all these spherical micro-particles for each of the multiple wavelengths. Further, the values (E) thus obtained for the wavelength range of blue, green and red lights, and $E_{min}/E_{max}$ to be obtained from them are shown in Table 1.

| <Coating solution for light diffusing layer> | |
| --- | --- |
| Acrylic resin | 14.25 parts |
| (Acrydic A-807: Dainippon Ink & Chemicals, Inc.) | |
| (Solid content: 50%) | |
| Styrene micro-particles | 20 parts |
| (Technopolymer SBX-12: Sekisui Plastics Co., Ltd.) | |
| (Coefficient of variation: 36.76%, average particle diameter: 11.3 μm, refractive index: 1.59) | |
| Diluting solvent | 40 parts |
| Curing agent | 2.79 parts |
| (Takenate D110N: Mitsui Chemicals Polyurethanes, Inc.) | |

Example 2

A light diffusing body of Example 2 was obtained in the same manner as that of Example 1 except that the coating solution for light diffusing layer of Example 1 was replaced by the following coating solution for light diffusing layer.

| <Coating solution for light diffusing layer> | |
| --- | --- |
| Acrylic resin | 14.25 parts |
| (Acrydic A-807: Dainippon Ink & Chemicals, Inc.) | |
| (Solid content: 50%) | |
| Styrene micro-particles | 20 parts |
| (Technopolymer SBX-8: Sekisui Plastics Co., Ltd.) | |
| (Coefficient of variation: 34.83%, average particle diameter: 8.9 μm, refractive index: 1.59) | |
| Diluting solvent | 40 parts |
| Curing agent | 2.79 parts |
| (Takenate D110N: Mitsui Chemicals Polyurethanes, Inc.) | |

Comparative Example 1

A light diffusing body of Comparative Example 1 was obtained in the same manner as that of Example 1 except that the coating solution for light diffusing layer of Example 1 was replaced by the following coating solution for light diffusing layer.

| <Coating solution for light diffusing layer> | |
| --- | --- |
| Acrylic resin | 14.25 parts |
| (Acrydic A-807: Dainippon Ink & Chemicals, Inc.) | |
| (Solid content: 50%) | |
| Styrene micro-particles | 40 parts |
| (Technopolymer SBX-6: Sekisui Plastics Co., Ltd.) | |
| (Coefficient of variation: 35.41%, average particle diameter: 6.3 μm, refractive index: 1.59) | |
| Diluting solvent | 63 parts |
| Curing agent | 2.79 parts |
| (Takenate D110N: Mitsui Chemicals Polyurethanes, Inc.) | |

The light diffusion bodies according to Examples 1 and 2 and Comparative Example 1 were evaluated by the visual inspection of the color of the light source from the projector seen from the front direction through the light diffusion body. The results are shown in Table 1.

TABLE 1

| | E(blue) | E(green) | E(red) | $E_{min}/E_{max}$ | hue |
| --- | --- | --- | --- | --- | --- |
| Example 1 | 2.103 | 2.103 | 2.121 | 0.992 | white |
| Example 2 | 2.111 | 2.117 | 2.151 | 0.981 | white |
| Comparative Example 1 | 2.166 | 2.325 | 2.485 | 0.872 | Pale blue |

The ratio of the minimum value ($E_{min}$) to the maximum value ($E_{max}$), $E_{min}/E_{max}$, of the effective scattering efficiency (E) in the wavelength range of blue, green and red light diffusing body was close to 1 in both Examples 1 and 2, and therefore, the shift of color tone of the light from the light source seen through the light diffusing body was reduced, and the white light source looked white without coloration.

In Comparative Example 1, wherein the ratio, $E_{min}/E_{max}$, was 0.872, because red light was scattered more than blue and green lights, and the amount of parallel rays of red light becomes relatively small than those of blue and green lights, the color tone of the light from the light source light seen through the light diffusing body was shifted to make the white color source look pale blue.

On the opposite surface to that on which a light diffusing layer of the transparent polymer film of Examples 1 and 2 is provided, a hard coat layer is provided to obtain a transmission type screen. The white light source seen from the transmission type screen was white without coloration.

The invention claimed is:

1. A light diffusing body comprising a transparent resin and spherical micro-particles having a refractive index which is different from that of the transparent resin,
wherein when the value obtained by dividing the sum of scattering cross-sections of all spherical micro-particles contained in the unit area of the light diffusing body by the sum of geometrical cross-sections of all these spherical micro-particles for each of multiple wavelengths, the minimum value of all of values obtained for each wavelength is 90% or higher of the maximum value.

2. The light diffusing body according to claim 1,
wherein the value E obtained by dividing the sum of scattering cross-sections of all spherical micro-particles by the sum of geometrical cross-sections of all these spherical micro-particles is expressed by the following equation (1).

$$E = \int_0^{max} Q(\lambda,r)f(r)dr / \int_0^{max} \pi r^2 f(r)dr \quad (1)$$

(In equation (1), Q is a scattering cross-section of one spherical micro-particle and a function of wavelength λ and particle diameter r, and f(r) is a particle diameter distribution function.)

3. The light diffusing body according to claim 1, wherein the multiple wavelengths are center wavelengths in the range of wavelength of blue, green and red.

4. The light diffusing body according to claim 1, wherein if the refractive index of the transparent resin is $n_m$ and the refractive index of the spherical micro-particles is $n_s$, $n_s/n_m$ satisfies $0.91<(n_s/n_m)<1.09$ (however, $n_s/n_m \neq 1$).

5. The light diffusing body according to claim 1, wherein the surface of the light diffusing body is substantially smooth.

6. A light diffusing body having a light diffusing layer and a transparent polymer film laminated on at least one surface of the light diffusing layer,
wherein the light diffusing layer comprises transparent resin and spherical micro-particles having a refractive index different from that of the transparent resin, and
when the value obtained by dividing the sum of scattering cross-sections of all spherical micro-particles contained in the unit area of the light diffusing body by the sum of geometrical cross-sections of all these spherical micro-particles for each of multiple wavelengths, the minimum value of all of values obtained for each wavelength is 90% or higher of the maximum value.

7. A transmission type screen having a light diffusing body according to claim 1.

8. A transmission type screen having a light diffusing layer on one of the surfaces of a transparent substrate, wherein the light diffusing layer uses a light diffusing body according to claim 1.

9. A transmission type screen having a light diffusing layer on one of the surfaces of a transparent substrate, wherein the light diffusing layer uses a light diffusing body according to claim 2.

10. A transmission type screen having a light diffusing layer on one of the surfaces of a transparent substrate, wherein the light diffusing layer uses a light diffusing body according to claim 3.

11. A transmission type screen having a light diffusing layer on one of the surfaces of a transparent substrate, wherein the light diffusing layer uses a light diffusing body according to claim 4.

12. A transmission type screen having a light diffusing layer on one of the surfaces of a transparent substrate, wherein the light diffusing layer uses a light diffusing body according to claim 5.

13. A transmission type screen having a light diffusing layer on one of the surfaces of a transparent substrate, wherein the light diffusing layer uses a light diffusing body according to claim 6.

14. A transmission type screen having a light diffusing body according to claim 2.

15. A transmission type screen having a light diffusing body according to claim 3.

16. A transmission type screen having a light diffusing body according to claim 4.

17. A transmission type screen having a light diffusing body according to claim 5.

18. A transmission type screen having a light diffusing body according to claim 6.

* * * * *

UNITED STATES PATENT AND TRADEMARK OFFICE
CERTIFICATE OF CORRECTION

| | |
|---|---|
| PATENT NO. | : 7,320,823 B2 |
| APPLICATION NO. | : 11/704998 |
| DATED | : January 22, 2008 |
| INVENTOR(S) | : Kitahara et al. |

It is certified that error appears in the above-identified patent and that said Letters Patent is hereby corrected as shown below:

Title page item 57
The ABSTRACT should read as follows:

-- A light diffusing body and transmission type screen, which can reduce the shift of the color tone of the light source light seen through the light diffusing body and prevent the phenomenon that the white light source seen through the light diffusing body looks colored, is provided. The light diffusing body of the present invention comprises a transparent resin and spherical micro-particles having a different refractive index from that of the said transparent resin, wherein the relation between the maximum value (Emax) and the minimum value (Emin) of the effective scattering efficiency values (E) obtained for each center wavelength in the wavelength ranges of blue, green and red by dividing the sum of scattering cross-sections of all spherical micro-particles contained in the unit area of the aforementioned light diffusing body by the sum of geometrical cross-sections of all these spherical micro-particles satisfies $Emin/Emax \geq 0.90$. --

Signed and Sealed this

First Day of July, 2008

JON W. DUDAS
*Director of the United States Patent and Trademark Office*